3,317,373
NOVOBIOCIN AS AN INSECTICIDE

Ford H. Harries, Wenatchee, Wash., assignor to the United States of America as represented by the Secretary of Agriculture
No Drawing. Filed Oct. 16, 1964, Ser. No. 404,539
7 Claims. (Cl. 167—33)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for destroying insects and for protecting plants and other materials from insects. Further objects of the invention will be evident from the following description wherein parts and percentages are by weight unless otherwise specified. The abbreviation "p.p.m." used herein means parts per million.

Novobiocin is an antibiotic produced by *Streptomyces niveus*. It has been reported to be active against human pathogens, for example, *Staphylococcus aureus*. Its structure—according to Hoeksema et al., Jour. Am. Chem. Soc. 78, 2019 and Hinman et al., Jour. Am. Chem. Soc., 79, 3789—is as follows:

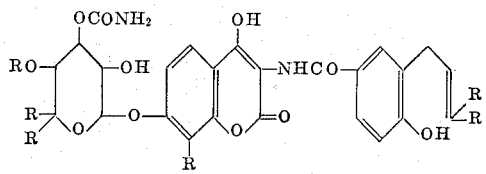

(wherein R stands for CH$_3$—)

I have found that novobiocin exhibits potent insecticidal properties and that it can be utilized effectively for destruction of insects. For example, I have found that novobiocin is extremely toxic to the codling moth and is many times more toxic to this insect than the best material heretofore recommended for its control, i.e., O,O-dimethyl S-[4-oxo-1,2,3-benzotriazin-3 (4H)-yl-methyl] phosphorodithioate. Other insects against which novobiocin is effective are, for example, pear psyllas, green peach aphids, and two-spotted spider mites.

In proceeding in accordance with the invention, novobiocin is applied directly to the insects to be destroyed or to the locus where the insects are present or where they may be expected. Such locus may be, for example, plant parts, soil, animal or human habitations, etc. In such applications, the novobiocin is generally employed in a form diluted with conventional liquid or solid pulverulent carriers—for example, water, petroleum distillates, talc, clay, ground walnut hulls, or other carriers well known in the art. The resulting compositions may be applied by the usual spraying or dusting procedures.

The compound novobiocin exhibits acidic properties and thus may be in the acid form or it may be in the form of a salt such as the sodium, potassium, or calcium salt. All of these forms are of equal insecticidal value, and the term "novobiocin" as used herein includes the acid and the salt froms of the antibiotic. Ordinarily, the antibiotic is available in commerce as the sodium salt and is used in such form.

The following examples illustrate the effectiveness of novobiocin as an insecticide:

Example 1

Aqueous solutions of novobiocin were tested against adult codling moths by applying a droplet of the solution on the ventral abdomen of the insects and then keeping them under observation to note the number of eggs laid and their mortality. In these tests, the novobiocin was applied in a series of dilutions, i.e., 2400, 1200, 600, 300, 150, and 75 p.p.m., and there were ten pairs of moths treated individually and held in separate cages for each dilution. The results obtained are tabulated below:

| Agent applied | Concentration of agent, p.p.m. | Number of eggs laid per female | | Mortality of females | |
|---|---|---|---|---|---|
| | | After 3 days | After 1 week | After 3 days, percent | After 1 week, percent |
| Novobiocin | 2,400 | 0.0 | 0.0 | 100 | 100 |
| Do | 1,200 | 0.0 | 0.0 | 100 | 100 |
| Do | 600 | 0.0 | 0.0 | 100 | 100 |
| Do | 300 | 0.0 | 0.0 | 100 | 100 |
| Do | 150 | 0.0 | 0.0 | 100 | 100 |
| Do | 75 | 14.4 | 14.4 | 60 | 90 |
| Do | 37.5 | 16.2 | 28.7 | 30 | 50 |
| "Guthion WP"[1] | 300 | 8.6 | 28.5 | 20 | 40 |
| None (control) | | 30.1 | 49.3 | 0 | 0 |

[1] O,O-dimethyl S-[4-oxo-1,2,3-benzotriazin-3 (4H)-yl-methyl]phosphorodithioate in wettable powder form (U.S. Patent 2,758,115).

Example 2

The procedure as described in Example 1 was applied to adult pear psyllas. The results are given below:

| Agent applied | Concentration of agent, p.p.m. | No. of eggs per female, after 24 hrs. | Mortality, after 24 hrs., percent |
|---|---|---|---|
| Novobiocin | 1,200 | 0.0 | 74 |
| Do | 600 | 0.01 | 63 |
| None (control) | | 0.65 | 6 |

Example 3

The procedure as described in Example 1 was applied to green peach aphids, 30 replicates of 10 alate females. The results are as follows:

Treatment:                      Mortality, percent
    Novobiocin, 1200 p.p.m. _____ 95
    Novobiocin, 600 p.p.m. _____ 88
    Untreated control _____ 6

Having thus described my invention, I claim:
1. A method for destroying insects which comprises contacting the insects with novobiocin.
2. A method for protecting a locus from insects which comprises applying novobiocin to the locus.
3. A method for protecting plants from insects which comprises applying novobiocin to them.

4. A method for destroying codling moths which comprises contacting them with novobiocin.

5. A method for destroying pear psyllas which comprises contacting them with novobiocin.

6. A method for destroying aphids which comprises contacting them with novobiocin.

7. A method for destroying mites which comprises contacting them with novobiocin.

No references cited.

LEWIS GOTTS, *Primary Examiner.*